A. PETERSON.
WAREHOUSE TRUCK.
APPLICATION FILED JULY 5, 1916.

1,220,269.

Patented Mar. 27, 1917.

INVENTOR
ALEX PETERSON

ATT'Y.

UNITED STATES PATENT OFFICE.

ALEX PETERSON, OF SAN FRANCISCO, CALIFORNIA.

WAREHOUSE-TRUCK.

1,220,269.

Specification of Letters Patent. Patented Mar. 27, 1917.

Application filed July 5, 1916. Serial No. 107,562.

*To all whom it may concern:*

Be it known that I, ALEX PETERSON, a citizen of the United States, residing at San Francisco, in the county of San Francisco and State of California, have invented new and useful Improvements in Warehouse-Trucks, of which the following is a specification.

The present invention relates to improvements in warehouse trucks.

In loading a heavy object on to a truck of this character it is at present the practice for the truckman to reach out with one hand and pull the object on to the truck while tilting the truck from an approximately vertical to an inclined position. When the load is very heavy this requires very great exertion on the part of the operator. It is the object of the present invention to provide a warehouse truck whereby the labor of loading heavy objects on to the truck will be greatly reduced.

Figure 1:
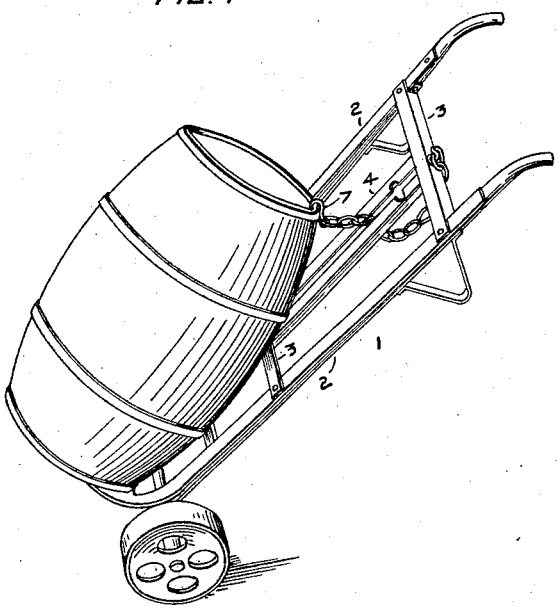
Figure 2:
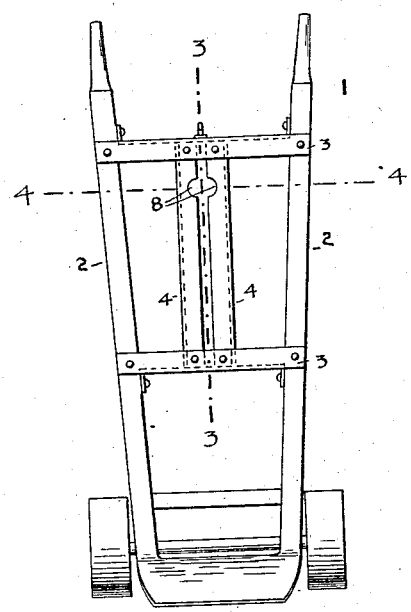
Figure 3:
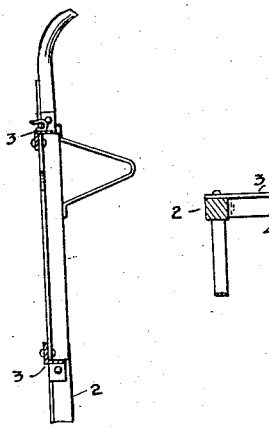
Figure 4:
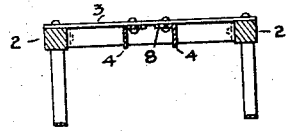

In the accompanying drawing, Figure 1 is a perspective view of my improved truck showing a barrel loaded thereon; Fig. 2 is a front view of the truck unloaded; Fig. 3 is a longitudinal section of the truck on the line 3—3 of Fig. 2; Fig. 4 is a transverse section thereof on the line 4—4 of Fig. 2.

Referring to the drawing, 1 indicates my improved warehous truck. Secured at their ends to side bars 2 of the truck, and spaced a suitable distance apart, are transverse angle-irons or bars 3, and secured to, and extending between, said angle-irons or bars 3 are longitudinal angle-irons or bars 4. The inner edges of the angle-irons 4 extend parallel with each other and are spaced apart for nearly the whole of their length a distance sufficient only to permit a link of a chain 6 to slide therein. Said chain is fastened at one end to a transverse angle-iron 3 remote from the wheels of the truck, and at the other end is attached to a hook 7 which can be used to engage a load to be carried by the truck. While said chain can slide in the slot between the two angle-irons 4 it cannot slide therethrough, for the distance between them, although greater than the thickness of each link of the chain, is less than its width, so that if said link be arranged in a plane at right angles to the longitudinal bars, it cannot pass through said slot.

To permit the chain to move in a plane at an angle with the longitudinal bars, in order to vary the length of that portion of the chain which serves to hold the load to the truck, the inner edges of the longitudinal bars are formed with registering recesses 8 of sufficient depth to provide a space through which the chain can freely move.

The use of my improved truck will be obvious from the foregoing description. One end of the chain is secured on an object to be loaded, and the chain is drawn backward through the enlarged portion of the slot as far as possible and is then moved into the narrow portion of the slot, and the object is firmly held to the truck by said chain. The operator may then take hold of the truck with both hands and tilt it from the approximately vertical position to that in which it can be wheeled upon the ground.

I claim:—

1. A truck having two parallel bars extending longitudinally from a point near the upper end of the truck to a point below the center of the truck and forming therebetween a slot, and a chain extending between the bars and having a hook at one end, the width of the slot being less than that of each link of the chain.

2. A truck having two parallel longitudinally extending bars, and a chain extending between the bars and having a hook at one end, the distance between the bars being less than the width of a link of the chain and the space between the bars being enlarged at a point thereon to permit the chain to pass therethrough.

ALEX PETERSON.

Copies of this patent may be obtained for five cents each, by addressing the "Commissioner of Patents, Washington, D. C."